United States Patent
Lauber

(10) Patent No.: US 11,273,392 B2
(45) Date of Patent: Mar. 15, 2022

(54) SEPARATING DEVICE FOR FLUID-COLLECTING SUMPS AND FLUID CONTAINER DEVICES COMPRISING SUCH A SEPARATING DEVICE

(71) Applicants: FAUDI Aviation GmbH, Stadtallendorf (DE); Uwe Lauber, Weimar (DE)

(72) Inventor: Uwe Lauber, Weimar (DE)

(73) Assignee: FAUDI Aviation GmbH, Stadtallendorf (DE)

( * ) Notice: Subject to any disclaimer, the term of this patent is extended or adjusted under 35 U.S.C. 154(b) by 0 days.

(21) Appl. No.: 16/327,881

(22) PCT Filed: Aug. 28, 2017

(86) PCT No.: PCT/EP2017/071529
§ 371 (c)(1),
(2) Date: Feb. 25, 2019

(87) PCT Pub. No.: WO2018/037132
PCT Pub. Date: Mar. 1, 2018

(65) Prior Publication Data
US 2019/0192997 A1  Jun. 27, 2019

(30) Foreign Application Priority Data
Aug. 26, 2016  (DE) .................... 20 2016 104 693.9

(51) Int. Cl.
*B01D 17/12* (2006.01)
*B01D 17/02* (2006.01)
*F02M 37/28* (2019.01)
*F02M 37/32* (2019.01)
*F02M 37/26* (2019.01)

(52) U.S. Cl.
CPC ......... *B01D 17/12* (2013.01); *B01D 17/0214* (2013.01); *F02M 37/26* (2019.01); *F02M 37/28* (2019.01); *F02M 37/32* (2019.01)

(58) Field of Classification Search
None
See application file for complete search history.

(56) References Cited

U.S. PATENT DOCUMENTS

| | | | |
|---|---|---|---|
| 3,485,370 A | 12/1969 | Nozaki et al. | |
| 3,849,285 A | 11/1974 | Prestridge | |
| 3,937,662 A | 2/1976 | Bartik | |
| 3,966,602 A | 6/1976 | Burger | |
| 3,966,603 A | 6/1976 | Grant | |
| 4,227,173 A * | 10/1980 | Clark | B01D 17/0214 210/746 |
| 4,649,281 A | 3/1987 | Schmitt et al. | |
| 5,002,657 A * | 3/1991 | Botts | B01D 17/00 210/115 |
| 5,080,781 A * | 1/1992 | Evins, IV | B01D 17/0214 166/369 |
| 5,139,653 A | 8/1992 | Ludlam et al. | |
| 6,368,498 B1 | 4/2002 | Guilmette | |

FOREIGN PATENT DOCUMENTS

| | | |
|---|---|---|
| DE | 195 36 310 | 5/1996 |
| DE | 196 14 829 | 10/1997 |
| DE | 103 50 781 | 7/2004 |
| DE | 20 2016 105701 | 11/2016 |
| EP | 2 987 996 | 2/2016 |
| JP | 08-282798 | 10/1996 |

* cited by examiner

Primary Examiner — Richard C Gurtowski
(74) Attorney, Agent, or Firm — Clark & Brody LP

(57) ABSTRACT

The invention relates to a separating device (1) for fluid-collecting sumps, in particular of filter or water separators, comprising a line pipe (10) which has a connection opening (11) and an outlet opening (12), wherein the line pipe (10) is equipped with a flow restrictor (20), a phase detection sensor (30) for detecting a phase boundary (G) between a light fluid (F1) and a heavy fluid (F2), and an electronically actuatable outlet valve (40) between the phase detection sensor (30) and the outlet opening (12). The outlet valve (40) is actuated by a regulating device (45) such that the outlet valve (40) is brought from an open position into a closed position when a phase boundary (G) is detected by the phase detection sensor (30). The invention additionally relates to fluid container devices (100) comprising a fluid-collecting sump (101) and such a separating device (1).

45 Claims, 1 Drawing Sheet

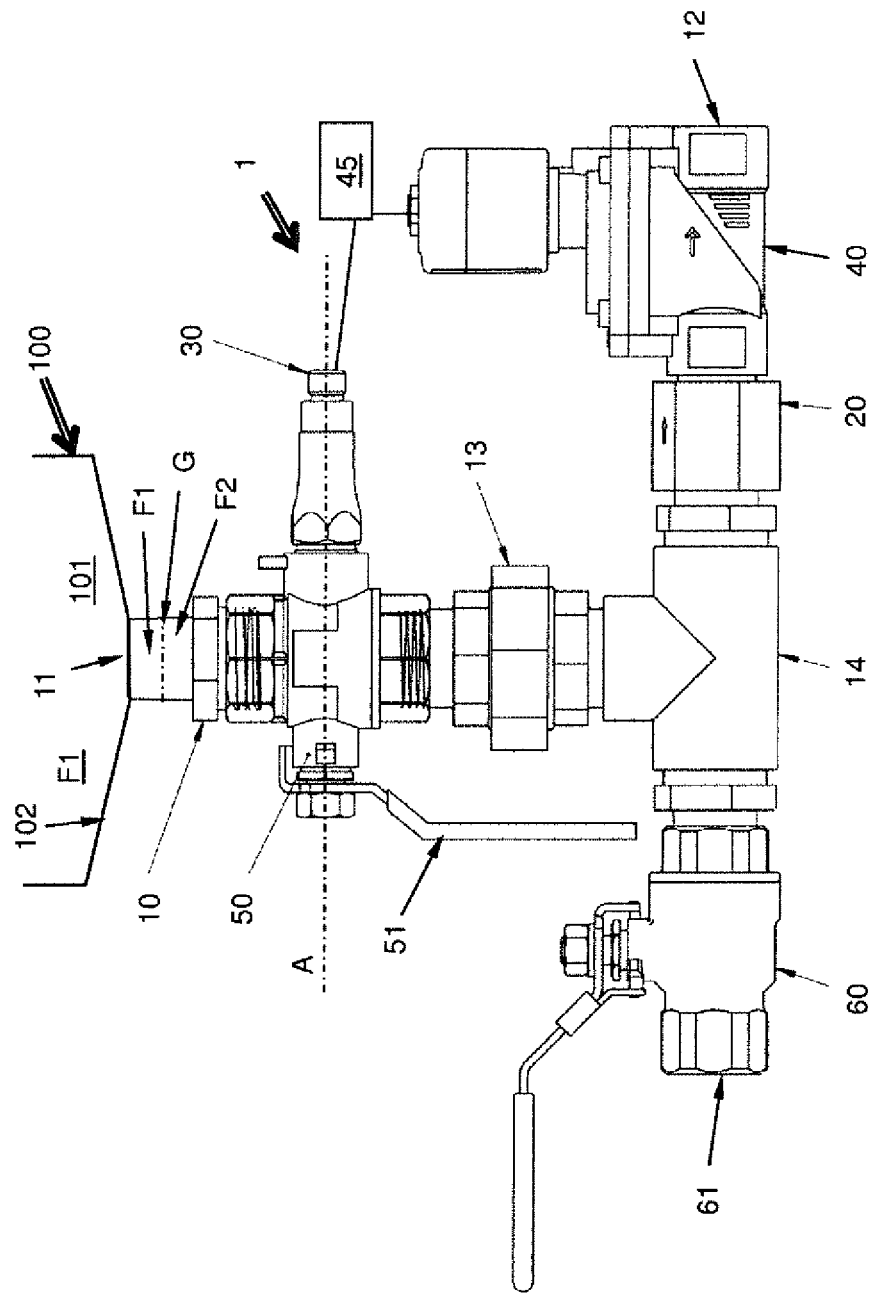

SEPARATING DEVICE FOR FLUID-COLLECTING SUMPS AND FLUID CONTAINER DEVICES COMPRISING SUCH A SEPARATING DEVICE

The invention relates to a separating device for fluid-collecting sumps, in particular of filter or water separators, as claimed in claim 1, and fluid container devices comprising such a separating device, as claimed in claims 39 and 42.

Separating devices for fluid-collecting sumps, in particular of filter or water separators, are used in order to collect a fluid contaminating the main fluid or to collect particles settling at the top or at the bottom and to drain off said fluid or particles from the collection location as necessary, this also being referred to as discharge or removal. Here, the main fluid should remain in the fluid container wherever possible.

It is for example known from the prior art to manually open an outflow valve at the bottom of the fluid-collecting sump and to close the outflow valve again when the lighter main fluid reaches the outflow opening. In the sense of the invention, light and heavy shall be understood to mean a low density (light) and a high density (heavy).

What is problematic here is that the reaction time of the operator is usually too slow, such that main fluid also escapes before the outflow valve is closed. This main fluid is then lost, and a mixture of the light and the heavy fluid collects in a collection container or dirt tank and in some circumstances has to undergo complicated treatment for disposal. This is true in particular for applications in which water, which is heavier, is separated from light fuel, such as oil, petrol, diesel or kerosene.

A further problem here is that microbe growth occurs at the phase boundary for example of kerosene and water, wherein the microbes spread from here into the kerosene and contaminate it. The intensity of the microbe growth is dependent on the contact area of the phase boundary. In the case that large fluid-collecting sumps are seldom manually emptied, this phase boundary is relatively large, and therefore heavy contamination of the kerosene with microbes occurs here.

The object of the invention is therefore to overcome the disadvantages from the prior art and to provide a separating device for fluid-collecting sumps with which minimal main fluid escapes when the contaminating fluid is let out and with which fuel such as kerosene can be kept as free as possible from microbes. The objective is also to enable existing fluid-collecting sumps to be retrofitted with the separating device so that the capital outlay for the operator is low. The separating device should additionally be economical and reliable and easy to maintain, in the best-case scenario without having to completely empty the fluid-collecting sump.

The main features of the invention are specified in claims 1, 39 and 42. Embodiments are the subject of claims 2 to 38, 40 to 41 and 43 to 44.

The invention relates to a separating device for fluid-collecting sumps, in particular of filter or water separators, comprising a pipeline which has a connection opening and an outlet opening, wherein the pipeline is equipped with a flow restrictor, a phase detection sensor for detecting a phase boundary between a light fluid and a heavy fluid, and an electronically actuatable outlet valve between the phase detection sensor and the outlet opening, wherein the outlet valve is actuated by a control device in such a way that the outlet valve is brought from an open position into a closed position in the event that a phase boundary is detected by the phase detection sensor.

By means of this device, a fully automatic separation of a second fluid from a first main fluid is now possible. The separation can be carried out so frequently and regularly that only small collections of the second fluid occur. If water is to be separated from a fuel, such as oil, petrol, diesel or kerosene, only small-area phase boundaries consequently are present, and therefore the fuel does not become contaminated with microbes growing at the phase boundary. In addition, the separating device ensures that no main fluid is drained, or only very small amounts of main fluid are drained. Specifically, if the phase boundary is detected, the main fluid has not yet arrived at the outlet valve. Due to the design with a pipeline, the separating device can be easily connected to an existing fluid-collecting sump and then can be used immediately. Because there is usually an outlet opening here anyway, it is possible to retrofit the separating device according to the invention in a simple manner.

In accordance with a more detailed embodiment, the phase detection sensor is arranged in a vertical conduit portion of the pipeline. This has the advantage that a horizontal phase boundary can be detected effectively.

In a first variant the phase detection sensor can be arranged geodetically beneath the connection opening. As a result, heavier fluid can be drained from a fluid sump arranged on the bottom side. Alternatively, however, it is also possible for the phase detection sensor to be arranged geodetically above the connection opening. As a result, light fluid can be drained from a fluid sump arranged on the top side.

In a specific embodiment the vertical conduit portion extends from the phase detection sensor to the connection opening. A horizontal phase boundary can be shifted up and down here without turbulence.

In an optional embodiment is also provided that the phase detection sensor is arranged at such a distance from the connection opening that the phase boundary can be kept between the connection opening and the phase detection sensor by the control device. The phase boundary consequently has a small surface, and only very minor microbe growth can occur.

Simple maintenance of the separating device is achieved in an embodiment in which a closure valve is arranged between the phase detection sensor and the connection opening. If the closure valve is closed, the phase detection sensor can be removed, without a relatively large amount of fluid escaping. This is expedient for example for calibration and maintenance of the phase detection sensor.

In a specific embodiment the closure valve has a closure element rotatable about an axis of rotation, wherein the axis of rotation is oriented transverse to the pipeline. Rotatable closure elements of this kind can be easily actuated.

A particularly compact embodiment is provided if the phase detection sensor extends along the axis of rotation into the pipeline. The phase boundary thus passes behind the closure element only to a minimal extent, if at all, and even in the event of maintenance only a small amount of main fluid, if any at all, reaches the outlet opening or another emptying opening.

A variant in which the closure valve is a ball valve can be actuated particularly easily and closed in a tightly sealed manner. Here, it can be provided that an actuation means of the ball valve is rotatable about the axis of rotation, wherein the actuation means is arranged on the side of the pipeline opposite the phase detection sensor. The actuation means, for example a lever, and the phase detection sensor therefore do not get in the way of one another.

The closure valve is preferably also arranged in the vertical conduit portion. The vertical conduit portion can thus extend from the phase detection sensor to the connection opening.

Furthermore, in accordance with a specific embodiment the flow restrictor is arranged between the phase detection sensor and the outlet valve. The phase boundary thus typically does not pass through the flow restrictor, where it could become swirled. In addition, the outlet valve can drain off a defined fluid.

In practice, it has proven to be particularly advantageous if the flow restrictor limits the flow volume to a constant flow value up to a line pressure on the side of the connection opening of 10 bar, preferably 14 bar, and more preferably 16 bar. The precise control of the discharge thus functions independently of the current line pressure on the side of the connection opening.

Also contributing to this is a specific variant in which the constant flow value is between 0.5 l/min and 3 l/min, preferably between 0.6 l/min and 2.5 l/min, more preferably between 0.7 l/min and 2.0 l/min, more preferably between 0.75 l/min and 1.5 l/min, and particularly preferably between 0.8 l/min and 1.2 l/min. In the practical example of water separation from fuel, a constant flow value of 1.0 l/min has proven to be expedient. In this case there are minimal leaks of the fuel that is not to be discharged.

A particularly good retrofitting capability is achieved if the pipeline is a ¾ inch pipe. Many manual discharge devices are based specifically on ¾ inch pipes, in particular G ¾". The separating device according to the invention can be easily connected to such pipes by means of the connection opening. A further advantage is that a large number of prefabricated components exist in the ¾ inch or G ¾" size, and an economical modular design of the separating device can be attained. This is consequently also simple and economical to repair should there be any damage.

A particularly simple assembly of the separating device is experienced if the connection opening and/or the outlet opening have/has a ¾ inch thread, in particular a G ¾" thread.

Because the outlet valve must ensure precise control at a relatively low flow rate, usually only a limited amount of fluid can flow out via said valve. In order to drain larger amounts of fluid, it has proven to be expedient to arrange an emptying valve between the connection opening and the outlet valve. This emptying valve for example can be opened in order to empty the fluid store.

An embodiment in which the emptying valve can be opened and closed manually has therefore proven to be expedient. In particular, the emptying valve can be a ball valve. This can be actuated quickly and easily.

The emptying valve is preferably arranged between the outlet valve and the phase detection sensor. The phase boundary can thus be detected by the phase detection sensor, even in the event that fluid is drained manually via the emptying valve.

The emptying valve is particularly preferably arranged between the connection opening and the flow restrictor. The fluid therefore does not have to flow through the flow restrictor before it reaches the emptying valve. Emptying is thus quick.

In a specific embodiment the outlet valve and the emptying valve are arranged on different sides of a manifold of the pipeline. An economical ball valve can thus be used as emptying valve. Alternatively, however, a 3-way valve could also be considered as an emptying valve.

In accordance with one embodiment the manifold adjoins the vertical conduit portion. The necessary installation space beneath or above the fluid store can hereby be relatively flat.

An economical modular design is achieved if the manifold is connected to the vertical conduit portion via a screw connection.

In order to attain a flat structure, a design in which the manifold has a T-junction is expedient. Embodiments in which the manifold is a T-piece are available particularly economically.

An embodiment in which the emptying valve is connected to the manifold via a screw connection also contributes to a modular construction. A high degree of modularity is also given if the flow restrictor is connected to the manifold via a screw connection.

A further contribution to high modularity can be provided in that the outlet valve is connected to the flow restrictor via a screw connection.

In one variant of the separating device, the outlet valve is actuated by the control device in such a way that the outlet valve is brought from the closed position into the open position in the event that the heavy fluid is detected by the phase detection sensor, so as to drain off the heavy fluid. Here, light main fluid is thus freed from a heavy contamination. For this purpose, the phase detection sensor should be arranged beneath the connection opening.

In accordance with another variant of the separating device the outlet valve is actuated by the control device in such a way that the outlet valve, in the event that the light fluid is detected by the phase detection sensor, is brought into an open position in order to drain off the light fluid. This is thus used in order to free a heavy main fluid of a lighter contamination. This can be oil in water, for example. To this end, the phase detection sensor should be arranged above the connection opening.

In order to monitor the functionality of the separating device, it is expedient to display the open position using a visualization means. In particular, variants in which the visualization means is a lighting means, preferably an LED display, are clearly visible. These are also clearly visible in a poorly lit environment.

The closed position can be displayed optionally using a visualization means. This visualization means may be a lighting means, preferably an LED display.

In order to prevent an excessively quick change from the open position into the closed position and vice versa, a specific embodiment provides that the control device has a delay transmitter, by means of which the control device outputs a control signal for the outlet valve only after a defined detection time of the phase detection sensor. The wear of the outlet valve is hereby also reduced. In a more economical embodiment the delay transmitter has a time relay.

Due to the limited flow rate of the flow restrictor, it may be expedient to supplement the separating device in such a way that is has an alarm transmitter, which outputs an alarm signal when the outlet valve assumes the open position for longer than a defined period of time, and/or if the phase detection sensor detects the heavy fluid or the contaminating fluid for longer than a defined period of time. As a result of the alarm signal it is notified that more contaminating fluid is passing into the connection opening than can be drained off by the outlet valve. The alarm transmitter can be provided here economically if it has a time relay.

The invention additionally relates to a fluid container device having a bottom-side fluid-collecting sump for a heavy fluid settling at the bottom from a light fluid, wherein the bottom of the fluid-collecting sump opens out into the connection opening of a separating device, as described above and hereinafter. Installed in this way, the separating device can discharge the heavier fluid, which thus settles at the bottom, and therefore the lighter main fluid is purified. To this end, the phase detection sensor should be arranged geodetically beneath the connection opening.

In a particular embodiment of the fluid container device a fluid fuel is arranged in or above the fluid-collecting sump as light fluid and is mixed with the heavy fluid consisting of water, wherein the heavy fluid settles in the direction of the bottom of the fluid-collecting sump and from here into the connection opening. High-quality fuel can thus be provided. At the same time and in accordance with the invention it is achieved that practically exclusively water passes into a collection container. The disposal costs for this consequently are low.

In a specific variant of the fluid container device a filter device is arranged above the fluid-collecting sump. Particularly during filtration, undissolved fluids become segregated from one another and then form layers on account of differing density.

The invention also relates to a fluid container device having a top-side fluid-collecting sump for a light fluid settling upwardly from a heavy fluid, wherein the top of the fluid-collecting sump opens out into the connection opening of a separating device, as described above and hereinafter.

The advantageous use of this fluid container device for example makes it possible to remove lighter oil from heavier water. To this end, the phase detection sensor should be arranged geodetically above the connection opening.

A more detailed embodiment of the fluid container devices in which the outlet opening is fluidically connected to a collection container is preferred. With an embodiment of this kind the discharged fluid can be collected.

In a variant in which an emptying valve is arranged between the connection opening and the outlet valve, as described above and hereinafter, it is expedient for the emptying valve to be fluidically connected to the collection container. Fluid discharged via the emptying valve thus also passes into the collection container.

Further features, details and advantages of the invention will become clear from the wording of the claims and from the following description of exemplary embodiments provided with reference to the drawing, in which:

FIG. 1 shows a fluid container device with a separating device.

In FIG. 1 a fluid container device 100 with a separating device 1 is shown.

The separating device 1 is suitable in particular for fluid-collecting sumps, such as filter or water separators. It has a pipeline 10 or a pipe network with a connection opening 11 and an outlet opening 12. A flow restrictor 20, a phase detection sensor 30 for detecting a phase boundary G between a light fluid F1 and a heavy fluid F2, and an electronically actuatable outlet valve 40 arranged between the phase detection sensor 30 and the outlet opening 12 are arranged in the pipeline 10.

The phase detection sensor 30 sits in a vertical conduit portion 13 of the pipeline 10, more specifically geodetically beneath the connection opening 11. The vertical conduit portion 13 extends from the phase detection sensor 30 to the connection opening 11.

In addition, a closure valve 50 is arranged between the phase detection sensor 30 and the connection opening 11. The closure valve 50 thus also sits in the vertical conduit portion 13. The closure valve 50 is a ball valve. This has a closure element rotatable about an axis of rotation A, wherein the axis of rotation A is oriented transverse to the pipeline 10, in particular the vertical conduit portion 13.

The phase detection sensor 30 extends along the axis of rotation A into the pipeline 10, and the closure element can close the pipeline 10 immediately before the phase detection sensor 30. An actuation means 51, in particular a lever of the ball valve, is also mounted rotatably about the axis of rotation A, wherein the actuation means 51 is arranged on the side of the pipeline 10 opposite the phase detection sensor 30.

The flow restrictor 20 is arranged between the phase detection sensor 30 and the outlet valve 40. In practice, flow restrictors 20 which limit the flow volume to a constant flow value up to a line pressure on the side of the connection opening 11 of 10 bar, preferably 14 bar, more preferably 16 bar, and very particularly preferably 20 bar are particularly suitable. The constant flow value should lie between 0.5 l/min and 3 l/min, preferably between 0.6 l/min and 2.5 l/min, more preferably between 0.7 l/min and 2.0 l/min, more preferably between 0.75 l/min and 1.5 l/min, and particularly preferably between 0.8 l/min and 1.2 l/min.

It can also be seen that an emptying valve 60 is arranged between the connection opening 11 and the outlet valve 40 and is formed as a ball valve and can be opened and closed manually. In particular, the emptying valve 60 is arranged between the outlet valve 40 and the phase detection sensor 30. In addition, the emptying valve 60 is arranged between the connection opening 11 and the flow restrictor 20.

It can be seen that the outlet valve 40 and the emptying valve 60 are arranged on different sides of a manifold 14 of the pipeline 10. The manifold 14 adjoins the vertical conduit portion 13 and has a T-junction.

As can be seen, the separating device 1 is constructed in a modular manner from individual parts. The manifold 14 is formed as a T-piece and is connected on the inlet side to the vertical conduit portion 13 via a screw connection. The manifold 14 is connected on the first outlet side via a screw connection to the emptying valve 60 and on the second outlet side via a screw connection to the flow restrictor 20. The outlet valve 40 is in turn connected via a screw connection to the flow restrictor 20. The closure valve 50 is also incorporated via screw connections into the pipeline 10 or the vertical conduit portion 13.

For the connection of further conduits, the connection opening 11, the outlet opening 12 and an emptying opening 61 of the emptying valve 60 each have a thread. In practice, it has proven to be advantageous if the pipeline 10 is a ¾ inch pipe and the connection opening 11, the outlet opening 12 and the emptying opening 61 have a ¾ inch thread, in particular a G ¾" thread.

It can also be seen in FIG. 1 that the fluid container device 100 has a bottom-side fluid-collecting sump 101 for a heavy fluid F2 settling at the bottom from a light fluid F1. Here, the bottom 102 of the fluid-collecting sump 101 opens out into the connection opening 11 of the separating device 1. Because the phase detection sensor 30 is arranged geodetically beneath the connection opening 11, the heavier fluid F2 can drain off in an automated manner using the separating device 1.

For example, it is thus possible for a fluid fuel to be arranged as light fluid F1 in or above the fluid-collecting sump 101 and to be mixed with the heavy fluid F2 consisting of water, wherein the heavy fluid F2 settles in the direction of the bottom 102 of the fluid-collecting sump 101, and from here into the connection opening 11.

The outlet valve 40 is actuated by means of a control device 45 in such a way that the outlet valve 40 is brought from an open position into a closed position in the event that the phase boundary G is detected by the phase detection sensor 30. Heavier fluid F2 can hereby be drained off from the bottom-side fluid sump 101. In addition, the outlet valve 40 is actuated by the control device 45 in such a way that it is brought from the closed position into the open position in the event that the heavy fluid F2 is detected by the phase detection sensor 30, so as to be able to drain off the heavy fluid F2.

Here, the phase detection sensor 30 is distanced from the connection opening 11 to such an extent that the phase boundary G can be kept between the connection opening 11 and the phase detection sensor 30 by the control device 45. This is true at least for the normally anticipated degree of contamination of the main fluid F1 by the heavier fluid F2.

The control device 45 has a delay transmitter, by means of which it outputs a control signal for the outlet valve 40 only after a defined detection time of the phase detection sensor 30.

Different delays can also be defined here, by which on the one hand the output of the control signal is delayed after detection of the phase boundary and on the other hand the output of the control signal is delayed after detection of the fluid F2 to be discharged. Here, there is the option that the control device 45 automatically adapts the defined detection time on the basis of previous cycles of operation. In a simple embodiment the delay transmitter can be configured as a time relay.

In addition, the separating device 1 has an alarm transmitter, which outputs an alarm signal when the outlet valve assumes the open position for longer than a defined period of time, and/or if the phase detection sensor 30 detects the heavy fluid F2 for longer than a defined period of time. As a result of the alarm signal it is notified that more heavy fluid F2 is passing into the connection opening 11 than can be drained off by the outlet valve 40. Acoustic, tactile and visual signals are suitable as alarm signals, for example in order to notify the operator of the emergency state. Optionally, however, error signals can also be output to electronic control devices. It is possible to specify the defined period of time with a time relay.

The invention is not limited to any of the above-described embodiments, and instead can be modified in many ways.

It is thus possible to display the open position and/or the closed position using a visualization means. The visualization means for example may be a lighting means or an LED display.

A further supplementation can consist in that a filter device is arranged above the fluid-collecting sump 101.

Also not shown is a supplementation in such a way that the outlet opening 12 and/or the emptying valve 60 are fluidically connected to a collection container or dirt tank.

An alternative embodiment of the fluid container device 100 utilizes an above-described separating device 1 in order to discharge a light fluid F1 from a heavy fluid F2. To this end, the alternative fluid container device 100 has a top-side fluid-collecting sump 101 for a light fluid F1 settling upwardly from a heavy fluid F2, wherein the top of the fluid-collecting sump 101 opens out into the connection opening 11 of the separating device 1. Here, the separating device 1 is oriented such that the phase detection sensor 30 is arranged geodetically above the connection opening.

In this case, the outlet valve 40 is actuated by the control device 45 in such a way that it is brought into an open position in the event that the light fluid F2 is detected by the phase detection sensor 30, in order to drain off the light fluid F2. The outlet valve 40 is closed again if the phase boundary G is detected.

With this alternative fluid container device 100, not only is it possible to discharge lighter, liquid fluid, but for example a venting is also possible, in other words it is possible to drain off air in the form of light gaseous fluid.

All features and advantages presented in the claims, the description and the drawing, inclusive of structural details, spatial arrangements and method steps, can be essential to the invention individually and in a wide range of combinations.

LIST OF REFERENCE SIGNS 1 separating device
10 pipeline
11 connection opening
12 outlet opening
13 vertical conduit portion
14 manifold
20 flow restrictor
30 phase detection sensor
40 outlet valve
45 control device
50 closure valve
51 actuation means
60 emptying valve
61 emptying opening
100 fluid container device
101 fluid-collecting sump
102 bottom
A axis of rotation
F1 light fluid
F2 heavy fluid
G phase boundary

The invention claimed is:

1. A separating device (1) for fluid-collecting sumps, comprising a pipeline (10) which has a connection opening (11) and an outlet opening (12),
wherein the pipeline (10) is equipped with a phase detection sensor (30) for detecting a phase boundary (G) between a light fluid (F1) and a heavy fluid (F2), and an electronically actuatable outlet valve (40) between the phase detection sensor (30) and the outlet opening (12),
wherein the outlet valve (40) is actuated by a control device (45) in such a way that the outlet valve (40) is brought from an open position into a closed position in the event that a phase boundary (G) is detected by the phase detection sensor (30),
wherein the phase detection sensor (30) is arranged in a vertical conduit portion (13) of the pipeline (10), and further
wherein the pipeline (10) is equipped with a flow restrictor (20), the flow restrictor (20) limiting the flow volume to a constant flow value that would provide a line pressure on a side of the connection opening (11) up to 10 bar.

2. The separating device (1) as claimed in claim 1, characterized in that the vertical conduit portion (13) extends from the phase detection sensor (30) to the connection opening (11).

3. The separating device (1) as claimed in claim 1, characterized in that the phase detection sensor (30) is arranged at such a distance from the connection opening (11) that the phase boundary (G) can be kept between the connection opening (11) and the phase detection sensor (30) by the control device (45).

4. The separating device (1) as claimed in claim 1, characterized in that a closure valve (50) is arranged between the phase detection sensor (30) and the connection opening (11).

5. The separating device (1) as claimed in claim 4, characterized in that the closure valve (50) has a closure element rotatable about an axis of rotation (A), wherein the axis of rotation (A) is oriented transverse to the pipeline (10).

6. The separating device (1) as claimed in claim 5, characterized in that the phase detection sensor (30) extends along the axis of rotation (A) into the pipeline (10).

7. The separating device (1) as claimed in claim 5, characterized in that the closure valve (50) is a ball valve.

8. The separating device (1) as claimed in claim 7, characterized in that an actuation means (51) of the ball valve is rotatable about the axis of rotation (A), wherein the actuation means (51) is arranged on the side of the pipeline (10) opposite the phase detection sensor (30).

9. The separating device (1) as claimed in claim 4, characterized in that the closure valve (50) is arranged in the vertical conduit portion (13).

10. The separating device (1) as claimed in claim 1, characterized in that the flow restrictor (20) is arranged between the phase detection sensor (30) and the outlet valve (40).

11. The separating device (1) as claimed in claim 1, characterized in that the flow restrictor (20) limits the flow volume to the constant flow value as far as the line pressure on the side of the connection opening (11) of 16 bar.

12. The separating device (1) as claimed in claim 11, characterized in that the constant flow value is between 0.5 l/min and 3 l/min.

13. The separating device (1) as claimed in claim 1, characterized in that the pipeline (10) is a ¾ inch pipe.

14. The separating device (1) as claimed in claim 1, characterized in that at least one of the connection opening (11) and the outlet opening (12) has a ¾ inch thread.

15. The separating device (1) as claimed in claim 1, characterized in that an emptying valve (60) is arranged between the connection opening (11) and the outlet valve (40).

16. The separating device (1) as claimed in claim 15, characterized in that the emptying valve (60) can be opened and closed manually.

17. The separating device (1) as claimed in claim 15, characterized in that the emptying valve (60) is a ball valve.

18. The separating device (1) as claimed in claim 15, characterized in that the emptying valve (60) is arranged between the outlet valve (40) and the phase detection sensor (30).

19. The separating device (1) as claimed in claim 15, characterized in that the emptying valve (60) is arranged between the connection opening (11) and the flow restrictor (20).

20. The separating device (1) as claimed in claim 15, characterized in that the outlet valve (40) and the emptying valve (60) are arranged on different sides of a manifold (14) of the pipeline (10).

21. The separating device (1) as claimed in claim 20, characterized in that the manifold (14) adjoins the vertical conduit portion (13).

22. The separating device (1) as claimed in claim 20, characterized in that the manifold (14) is connected to the vertical conduit portion (13) via a screw connection.

23. The separating device (1) as claimed in claim 20, characterized in that the manifold (14) has a T-junction.

24. The separating device (1) as claimed in claim 20, characterized in that the manifold (14) is a T-piece.

25. The separating device (1) as claimed in claim 20, characterized in that the emptying valve (60) is connected to the manifold (14) via a screw connection.

26. The separating device (1) as claimed in claim 20, characterized in that the flow restrictor (20) is connected to the manifold (14) via a screw connection.

27. The separating device (1) as claimed in claim 1, characterized in that the outlet valve (40) is connected to the flow restrictor (20) via a screw connection.

28. The separating device (1) as claimed in claim 1, characterized in that the outlet valve (40) is actuated by the control device (45) in such a way that, in the event that the heavy fluid (F2) is detected by the phase detection sensor (30), the outlet valve (40) is brought from the closed position into the open position so as to drain off the heavy fluid (F2).

29. The separating device (1) as claimed in claim 1, characterized in that the outlet valve (40) is actuated by the control device (45) in such a way that the outlet valve (40), in the event that the light fluid (F1) is detected by the phase detection sensor (30), is brought into an open position in order to drain off the light fluid (F1).

30. The separating device (1) as claimed in claim 1, characterized in that the open position is displayed using a visualization means.

31. The separating device (1) as claimed in claim 30, characterized in that the visualization means is a lighting means.

32. The separating device (1) as claimed in claim 1, characterized in that the closed position is displayed using a visualization means.

33. The separating device (1) as claimed in claim 32, characterized in that the visualization means is a lighting means.

34. The separating device (1) as claimed in claim 1, characterized in that the control device (45) has a delay transmitter, by means of which the control device (45) outputs a control signal for the outlet valve (40) only after a defined detection time of the phase detection sensor (30).

35. The separating device (1) as claimed in claim 34, characterized in that the delay transmitter has a time relay.

36. The separating device (1) as claimed in claim 1, characterized in that said separating device (1) has an alarm transmitter, which outputs an alarm signal when the outlet valve (40) assumes the open position for longer than a defined period of time, and/or if the phase detection sensor (30) detects the heavy fluid (F2) for longer than a defined period of time.

37. The separating device (1) as claimed in claim 36, characterized in that the alarm transmitter has a time relay.

38. A fluid container device (100) having a bottom-side fluid-collecting sump (101) for a heavy fluid (F2) settling at the bottom from a light fluid (F1), wherein the bottom (102) of the fluid-collecting sump (101) opens out into the connection opening (11) of a separating device (1) as claimed in claim 1.

39. The fluid container device (100) as claimed in claim 38, characterized in that a fluid fuel is arranged in or above the fluid-collecting sump (101) as light fluid (F1) and is mixed with the heavy fluid (F2) consisting of water, wherein the heavy fluid (F2) settles in the direction of the bottom (102) of the fluid-collecting sump (101) and from here into the connection opening (11).

40. The fluid container device (100) as claimed in claim 38, characterized in that a filter device is arranged above the fluid-collecting sump (101).

41. A fluid container device (100) having a top-side fluid-collecting sump (101) for a light fluid (F1) settling upwardly from a heavy fluid (F2), wherein the top of the fluid-collecting sump (101) opens out into the connection opening (11) of a separating device (1) as claimed in claim 1.

42. The fluid container device (100) as claimed in claim 38, characterized in that the outlet opening (12) is fluidically connected to a collection container.

43. The fluid container device (100) as claimed in claim 42, wherein an emptying valve (60) is arranged between the connection opening (11) and the outlet valve (40), characterized in that the emptying valve (60) is fluidically connected to the collection container.

44. The fluid container device (100) as claimed in claim 41, characterized in that the outlet opening (12) is fluidically connected to a collection container.

45. The fluid container device (100) as claimed in claim 44, wherein an emptying valve (60) is arranged between the connection opening (11) and the outlet valve (40), characterized in that the emptying valve (60) is fluidically connected to the collection container.

\* \* \* \* \*